Jan. 21, 1958  E. R. WERYCH ET AL  2,820,875
HIGH FREQUENCY DIELECTRIC HEATING APPARATUS
Filed June 23, 1954  6 Sheets-Sheet 1

INVENTORS
EWALD R. WERYCH
BY LAWRENCE W. PETERSON
Wheeler, Wheeler & Wheeler
ATTORNEYS Jan. 21, 1958 E. R. WERYCH ET AL 2,820,875
HIGH FREQUENCY DIELECTRIC HEATING APPARATUS
Filed June 23, 1954 6 Sheets-Sheet 2

Fig. 2

INVENTORS
EWALD R. WERYCH
BY LAWRENCE W. PETERSON

Wheeler, Wheeler & Wheeler
ATTORNEYS

Jan. 21, 1958  E. R. WERYCH ET AL  2,820,875
HIGH FREQUENCY DIELECTRIC HEATING APPARATUS
Filed June 23, 1954  6 Sheets-Sheet 4

INVENTORS
EWALD R. WERYCH
BY LAWRENCE W. PETERSON
Wheeler, Wheeler & Wheeler
ATTORNEYS INVENTORS
EWALD R. WERYCH
LAWRENCE W. PETERSON
BY
Wheeler, Wheeler & Wheeler
ATTORNEYS _United States Patent Office_

2,820,875
Patented Jan. 21, 1958

2,820,875

HIGH FREQUENCY DIELECTRIC HEATING APPARATUS

Ewald R. Werych, Elm Grove, and Lawrence W. Peterson, Milwaukee, Wis., assignors to Industrial Electronic Engineering Corp., Milwaukee, Wis., a corporation of Wisconsin Application June 23, 1954, Serial No. 438,768

14 Claims. (Cl. 219—10.75)

This invention relates to a high frequency dielectric heating apparatus.

The particular embodiment disclosed includes a portable hand tool connected by coaxial cable with a cabinet housing power apparatus. The hand tool has spaced electrode plates connected with the secondary terminals of a high frequency transformer in a tuned circuit which must be matched to the work. Since some components of the circuit (including a tuning condenser) are in a remote cabinet and connected to the electrodes through a coaxial cable and transformer, it becomes a problem to match the transformer secondary to the cable while still neutralizing the remaining reactance of the work. For this purpose balancing coils are connected between the transformer and the electrodes and disposed at right angles to the axis of the secondary to compensate for the remaining reactance of the work without affecting the match between the secondary and the cable.

The hand tool carries a low voltage switch for turning on the current at the cabinet through an appropriate relay. It also is provided with switch means for operating a circuit tuning motor in the cabinet in forward or reverse directions, whereby the circuit can be tuned to the work by remote control. By eliminating the circuit tuning condenser from the hand tool and matching the impedance of the hand tool to the coaxial cable, we not only provide a device which operates with great efficiency, but we make it possible to use a very compact housing for the hand tool, and one which can be used in much closer quarters than would otherwise be possible, arcing being substantially eliminated.

The particular arrangement of the tuning condenser within the cabinet is also a feature of the invention. The movable plate and its guides are mounted on one portion of the cabinet, while the relatively fixed plates and the electronic components to which they are connected are mounted on a shelf for unitary removal from the cabinet.

Still another feature of the invention has to do with the arrangement of the parts for servicing or repair. Some of the parts which require relatively little attention are mounted unitarily on a panel which can be bodily removed when necessity arises. Other parts which may require more attention are mounted on two independently removable shelves which have jack and plug connections for all circuits. Thus, the withdrawal of either shelf protects the operator by automatically breaking all of the circuits to the components on that shelf. If any components on a given shelf requires replacement or repair, the given shelf and all components mounted thereon may be unitarily withdrawn. The act of withdrawal opens all of the circuits. Replacement with an interchangeable shelf or replacement of the given shelf after repair automatically re-establishes all circuits.

Figure 1:
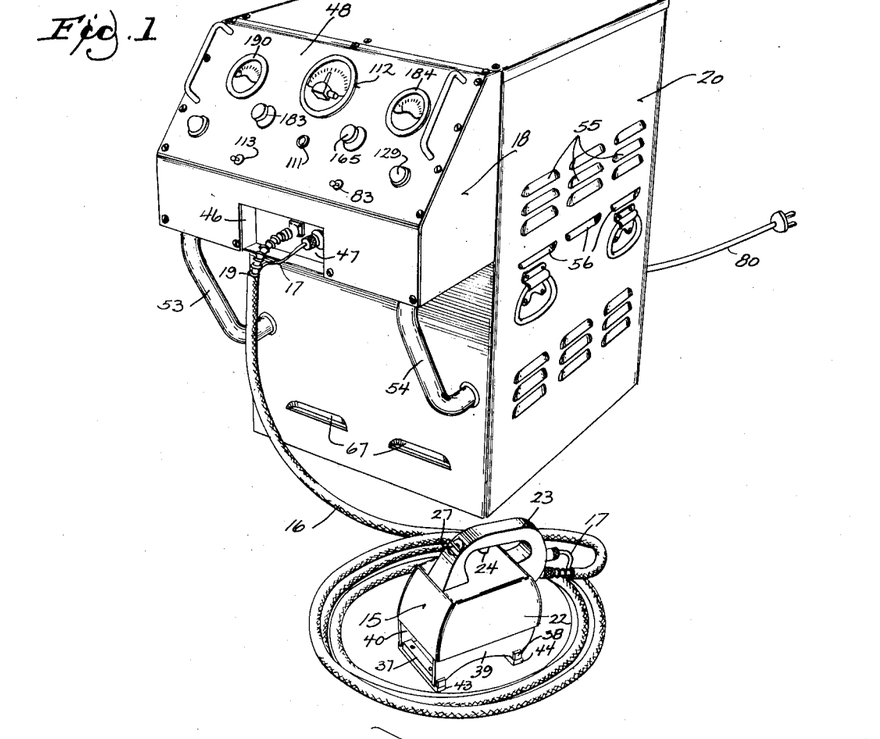
Fig. 1 is a view in perspective showing apparatus embodying the invention.

The hand tool 15 is electrically connected by coaxial cable 16 and conductor 17 with the forward extension 18 of cabinet 20. Conductor 17 is desirably enclosed within the protective covering which encloses the sheath 19 of the coaxial cable so that there is only one composite flexible cable connecting the hand tool with the cabinet.

The hand tool is best shown in Figs. 8 to 13. It comprises a housing 22 having a hollow handle 23 equipped with a push button type on and off switch 24 and tuning control switches 25, 26 which are unusual in that both are normally closed. A tiltable thumb piece 27 pivoted at 28 to handle 23 engages contact actuators 29, 30 of the respective switches so that either switch may be opened selectively at the desire of the operator.

Figure 8:
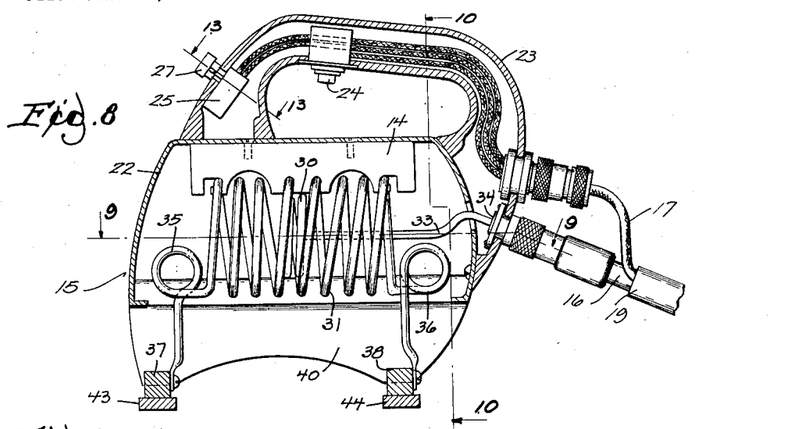
Fig. 8 is a detailed view in longitudinal section through the hand tool embodying the invention.

Within the housing portion 22 of the tool is a transformer which comprises a primary at 30 arranged within the central portion of a secondary 31. The spaced coils of the secondary are mechanically supported by engagement in notches of a dielectric plate 14. Both the primary and the secondary are desirably made of copper tubing. One end of the primary is grounded at 32. The other end is connected by a portion 33 of the tubing to the terminal 34 of the co-axial cable 16. The sheath of the cable is grounded to the housing.

The tube which forms the secondary coil 31 continues at the respective ends of that coil to form tightly wound coils 35 and 36 which extend transversely of the housing at right angles to, and somewhat below, the axis of the high frequency transformer. The coils 35 and 36 are respectively adjacent the front and the rear of the housing 22.

Figures 9, 10, 11, 12, 13:
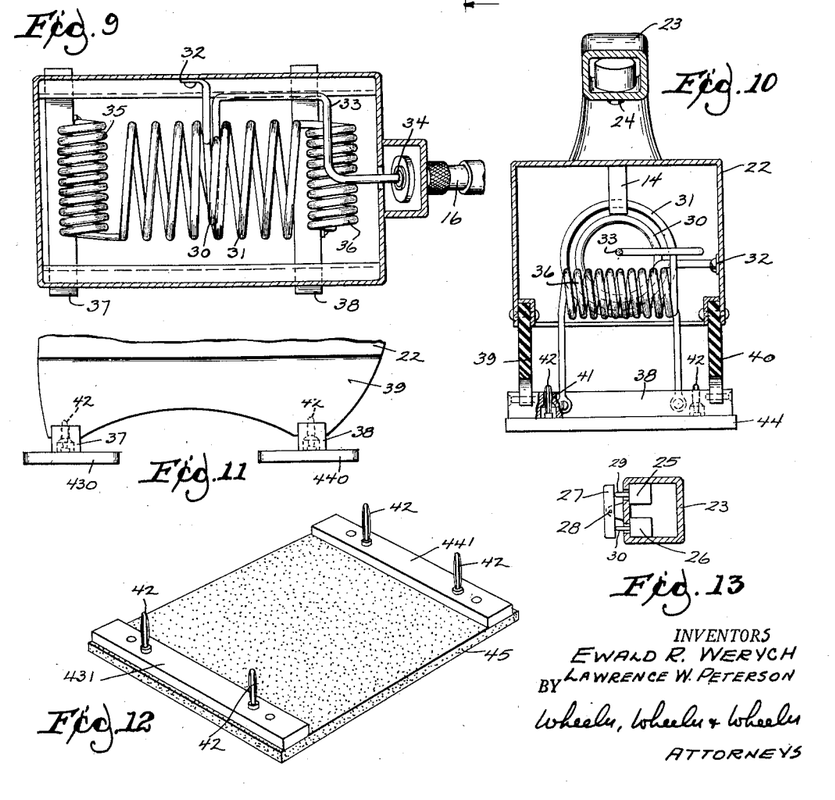
Fig. 9 is a view taken in section on line 9—9 of Fig. 8.
Fig. 10 is a view taken in section on the line 10—10 of Fig. 8.
Fig. 11 is an enlarged fragmentary detailed view of the lower portion of the hand tool as it appears in side elevation, showing the use of substitute electrodes.
Fig. 12 is an enlarged detail view in perspective of a substitute electrode unit.
Fig. 13 is a detailed view taken in section on line 13—13 of Fig. 8.

The free ends of the tubing from coils 35 and 36 are carried down and connected to bars 37, 38 respectively. These bars extend transversely of the hand tool and are mounted between dielectric side plates 39 and 40 which are connected to the housing to project therebeneath. Bars 37 and 38 are socketed at 41 to receive interchangeable electrode plates which have expansion plugs 42 receivable into the sockets. In Figs. 8 to 10 relatively narrow electrode paltes 43, 44 are positioned beneath the bars 37, 38. Fig. 11 shows wider plates 430 and 440 to have been substituted. Fig. 12 shows another alternative arrangement in which plates 431 and 441 are unitarily connected by a dielectric sheet 45 which, in practice, we make of fiber glass, although other materials may be used. The sheet 45 serves the function of the sole of a flat iron and serves to smooth or press the work during dielectric heating by the high frequency current, when such pressure is needed.

It will be observed that the forward electrode 43, or the alternate electrodes 430 or 431, is at the extreme front of the housing and may extend beyond the housing as in Fig. 12, to enable the tool to work into a corner which might not otherwise be accessible.

Because of the importance of matching the impedance of the units of the hand tool to that of the coaxial cable, parts of the cable and hand tool as actually used in a preferred embodiment will be given to guide those skilled in the art.

The coaxial cable actually used is 15 feet long and has an impedance of 52 ohms. For operating at approximately 40–43 meg., we use in the hand tool a primary of two turns of 1/8 inch copper tubing in a coil of 1½ inch internal diameter, the turns being spaced by ¼ inch. The secondary comprises 8 turns of 1/8 copper tubing wound to 2 inches internal diameter and an overall length of 3⅛ inches. Each of the balancing coils comprises 12 turns of the same 1/8 inch tube wound to a coil of ¾ inch internal diameter 2 3/16 inches long.

Figure 5:
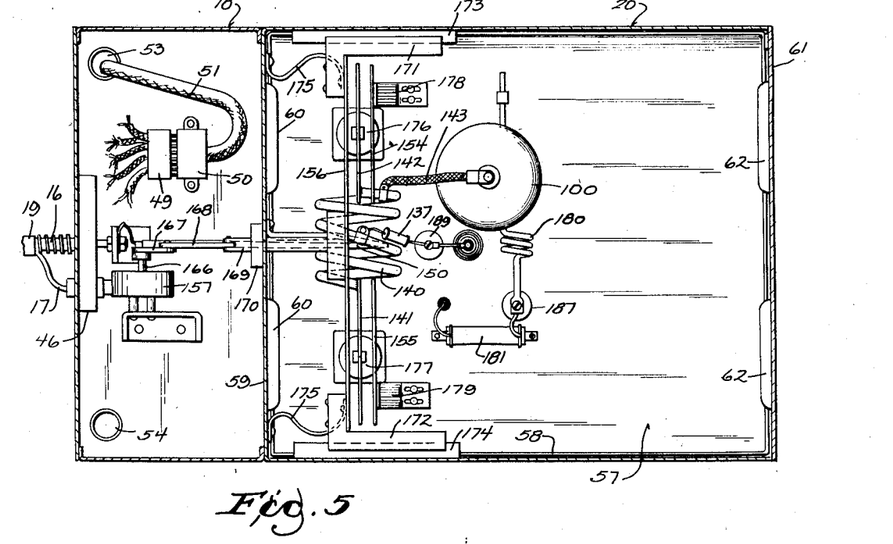
Fig. 5 is a view in horizontal section through the cabinet showing the high frequency shelf and the components carried thereby in plan.

The electrical connections from the hand tool to the cabinet 20 desirably enter the forward extension 18 of the cabinet in recess 46 at the back of which there is a panel 47 having plug and socket means for detachably connecting the coaxial cable and conductor 17 when desired. Covering the front and top of forward extension 18 is another panel 48 which is detachable and which supports all, or substantially all, of the instruments. As best shown in Fig. 5, a multiple plug connector including separable parts 49, 50 is mounted within the extension 18 of the cabinet so that the several connections to the instruments may readily be broken to permit the mounting panel 48 to be removed unitarily with the instruments. The wiring cable 51 from the connector part 50 extends downwardly into the cabinet through one of the tubular braces 53, 54 which supports the extension 18 from the lower part of the cabinet.

Figure 3:
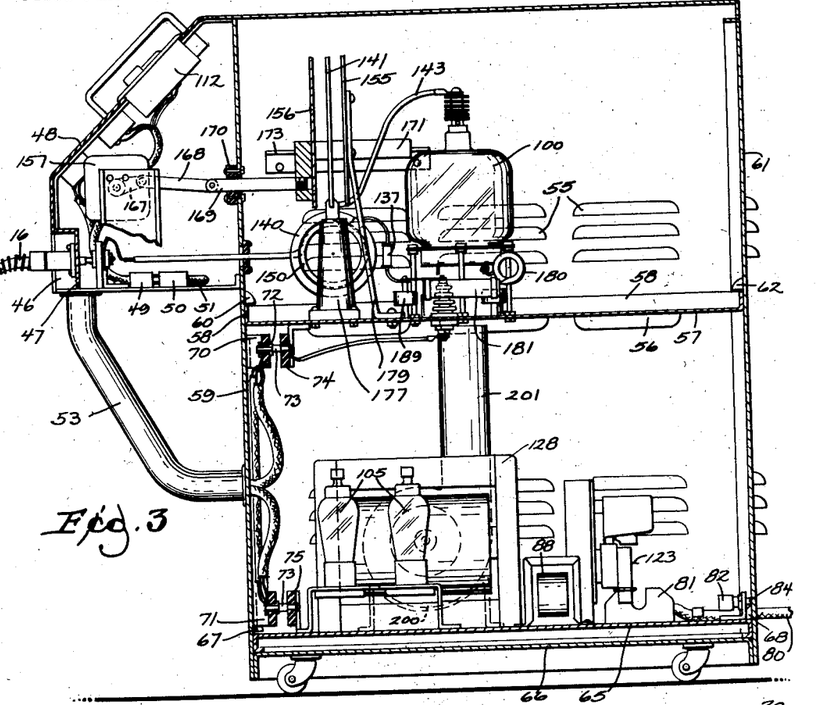
Fig. 3 is a view in longitudinal section through the cabinet.
Figure 4:
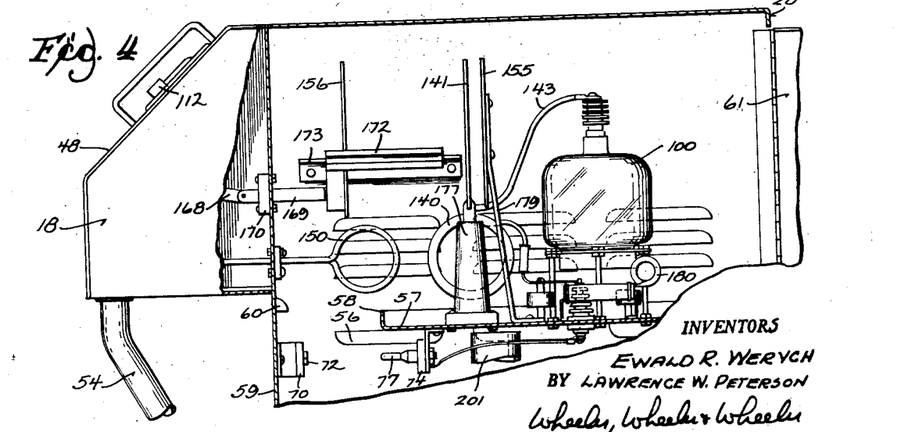
Fig. 4 is a fragmentary view similar to Fig. 3 showing the high frequency component shelf in a partially withdrawn position.

The cabinet is provided with louvers at 55 for ventilation. The same sort of louvers in inverted positions at 56 provide supports for a removable top shelf at 57 which is pan shaped having marginal flanges 58 for strength (see Figs. 2 and 3). At a level slightly above the level of louvers 56, the front wall 59 of the cabinet has a louver 60 which engages above the flange 58 of the shelf to secure it against upward displacement. The hinged door 61 at the rear of the cabinet has a similar louver at 62, which, in the closed position of the door engages over the rear flange of shelf 57, as shown in Fig. 3. With the door open, the shelf may readily be withdrawn on the guideways provided by the top margins of the louvers 56 (Fig. 4). The bottom shelf 65 rests on the bottom wall 66 of the cabinet and is similarly anchored against upward displacement in the closed cabinet by a louver 67 overhanging its forward end and a louver 68 carried by the door and overhanging its rearward end.

Figure 7:
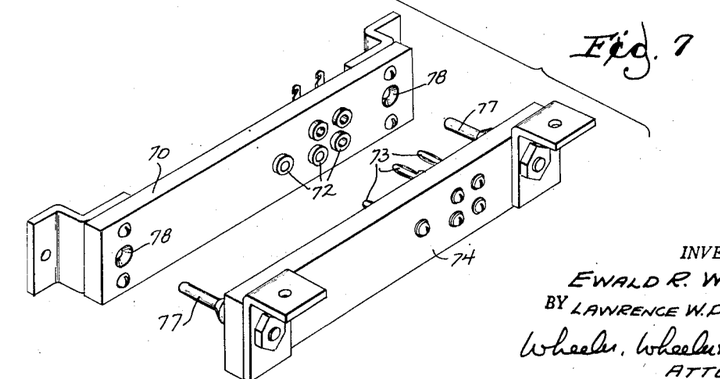
Fig. 7 (sheet 1) is an enlarged detailed view in perspective showing the plug and jack arrangements used to open and close the electrical connections to one of the shelves as the shelf is withdrawn or replaced.

Fixed to the front wall 59 of the cabinet are jack brackets 70 and 71 provided with receptacles 72 to receive "banana plugs" or expansible spring sided plugs 73 carried by the plug brackets 74, 75 which are respectively mounted on the top and bottom shelves, as best shown in Fig. 3. Details of brackets 70 and 74 are also shown in Fig. 7 and are typical of brackets 71, 75 also. In each instance, dowel means is provided on the plug bracket as shown at 77 in Fig. 7. The dowels project beyond the plugs 73 to be received into the tapered mouths of the sockets 78 in the receptacle bracket so as to guide the two brackets in their approach toward each other and to assure proper engagement of the plugs 73 into the respective receptacles 72. In this manner, all of the electrical connections for the components mounted on the respective shelves are simultaneously made and broken upon the positioning or retraction of the shelf.

The lower shelf 65 carries all of the power supply components. For the following description thereof, reference is made to the wiring diagram, Fig. 14, and to the physical illustrations of the parts, as in Figs. 2 and 3. The electrical supply cord 80 enters through the rear door 61 of the cabinet and is connected through fuses 81 and a door switch 82 to a double pole control switch 83 on the instrument panel 48. The actuator 84 for the door switch is biased toward open position so that switch 82 is open at all times except when the rear door 61 of the cabinet is shut.

Figure 14:
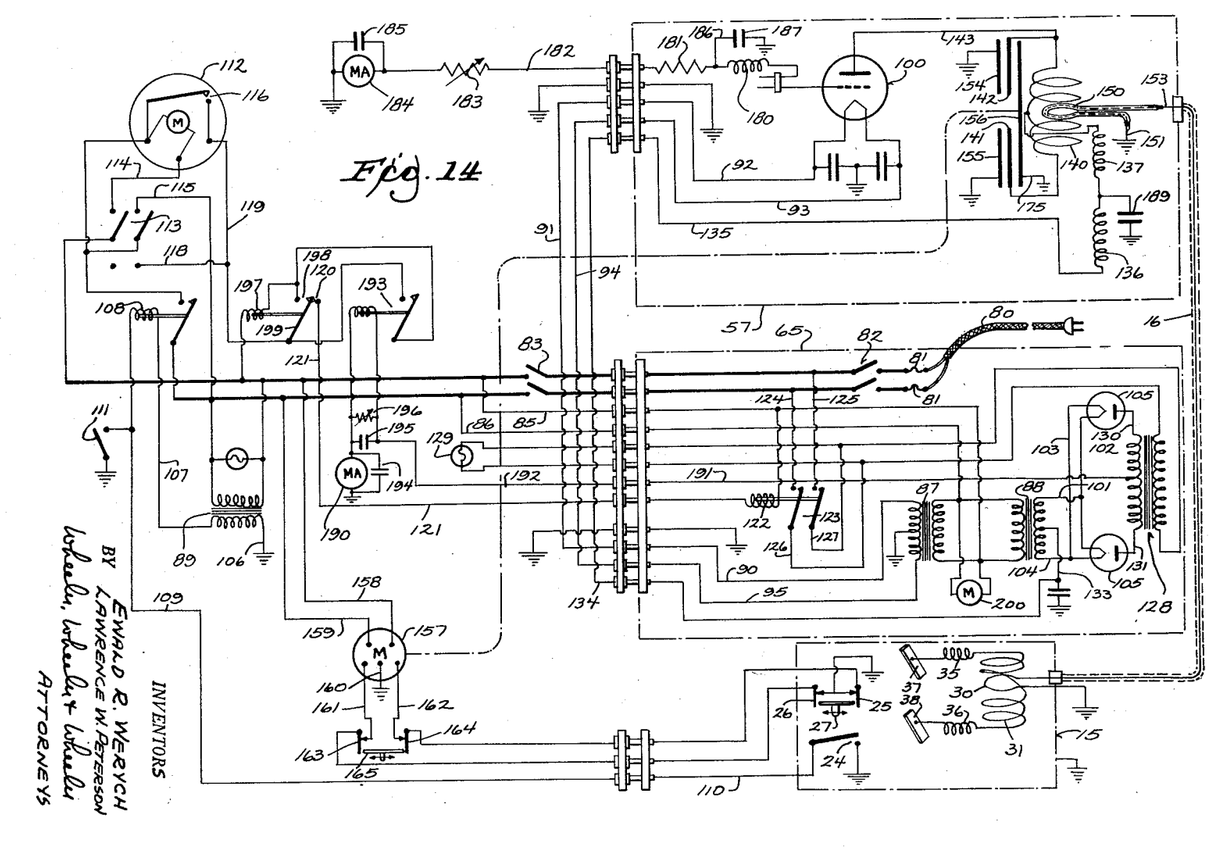
Fig. 14 is a circuit diagram showing the wiring connections.

With the main control switch 83 closed, current is carried by conductors 85, 86 to the primaries of transformers 87, 88 on shelf 65 and to the primary of transformer 89 in the forward extension 18 of the cabinet. The secondary of transformer 87 is connected by conductors 90, 91, 92, 93, 94 and 95 and intervening jacks and receptacles to the filament of the oscillator tube 100 which is mounted on the upper shelf 57.

The secondary of transformer 88 is connected by conductors 101, 102, 103, and 104 across parallel-connected filaments of rectifier tubes 105.

The secondary of transformer 89 is connected to ground at 106 and is connected by conductor 107 through the relay 108 and conductors 109, 110 to the switch 24 of the hand tool and a parallel switch 111 mounted on the cabinet, the return from both switches being through ground. Conductor 110 is a part of conductor 17, already described as leading to the hand tool from the cabinet.

The duration for which the circuit controlled by relay switch 108 will remain closed following the operation of either of the switches 24 or 111 may be pre-determined by means of a timer 112, or it may depend solely on the length of time for which the switches 24 or 111 are held shut. Whether or not the timer acts is determined by the double throw switch 113, which is shown in open position in the circuit diagram of Fig. 14. If the contacts of this switch are closed to connect the relay switch 108 with conductors 114, 115, the timer will be in the circuit, which will thereupon remain closed for a period determined by the motor driven timer switch 116. If the contactors of the double throw switch 113 are in their downward position, as viewed in Fig. 14, the circuit from the relay 108 will be closed directly through conductor 118 to conductor 119, to omit the timer.

In any event, the closing of the relay 108, in response to the manually operated switches 24 or 111, will convey current through the relay switch 120 and conductor 121 to the coil 122 of relay switch 123. The closing of relay switch 123 will complete circuits directly from the main line conductors through conductors 124 and 125 to conductors 126 and 127 to energize the primary of the power transformer 128. A pilot light 129 is connected in parallel with this transformer. The secondary of the transformer is connected through conductors 130 and 131 to supply the plate of each rectifier tube 105 with 3000 volts. The current rectified in these tubes at the stepped up voltage produced by power transformer 128 passes from the center tapped secondary of transformer 88 through conductor 133 and one of the plug and jack connections to conductor 134 and thence through another plug and jack connection to conductor 135 on the upper shelf 57. This conductor leads through series connected choke coils 136, 137 to an intermediate turn of the tank coil 140 which is connected across plates 141 and 142 of the tuning condenser. The remote end of the tank coil is also connected by conductor 143 with the plate of the oscillator tube 100 to which the rectified current is thus supplied. The single turn secondary 150 of the tank coil 140 is grounded at one end through its tubular Faraday shield 151 and has its other end connected at 153 into the coaxial cable 16 which leads to the hand tool. The shield minimizes capacitive coupling so that the coil 150 is coupled inductively only, thereby minimizing harmonic radiation.

The tuning condenser for the tank coil 140 includes grounded plates 154 and 155 associated with plates 142 and 141 respectively. Also included is the tuning plate 156, also grounded, which extends across both of the plates 141 and 142 and is moved to and fro by a motor 157, subject to the control of the operator.

The motor 157 is mounted in the cabinet extension 18 and is reversible. It has direct connection through conductors 158 and 159 with the supply line. It has a ground connection at 160 and it has forward and reverse leads at 161 and 162 extending to the normally closed manually operable switches 163, 164 and the series connected normally closed switches 25 and 26 of the hand tool, as already described. Switches 163, 164 are mounted on the panel 48 of the cabinet to be operated by the manually movable slide 165 so that the motor 157 may be controlled either at the hand tool or at the cabinet.

Because the control switches are normally closed, the tuning motor 157 is normally subject to equal and opposite forces tending to cause it to operate forwardly and in reverse. As long as the switches are closed, the motor remains stationary. When any of the four switches 25, 26, 163, 164 is opened it will open the circuit to one side of motor 157, leaving the circuit to the other side closed. The motor will then operate in one direction or the other, according to which circuit remains closed.

Reference has been made to the fact that both the forward and reverse circuits of the motor which tunes the condenser are normally closed. This is a valuable means of developing counter E. M. F. immediately upon the release of the control button to prevent overrun of the motor. By reason of this feature, the motor stops instantly when the button is released.

Figure 6:
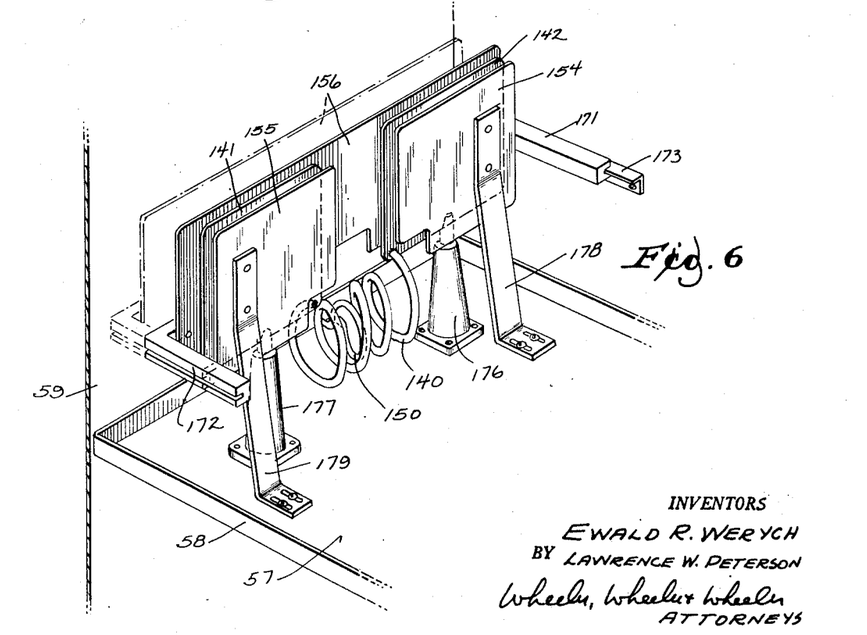
Fig. 6 is a fragmentary detailed view on an enlarged scale showing the tuning condenser in perspective.

The armature shaft 166 of the motor carries a crank 167 attached by connecting rod 168 (Fig. 5) to a push rod 169 extending through a guide bearing 170 in the front wall of the cabinet and connected centrally to the movable condenser plate 156. This plate is carried at its ends on sliders 171, 172 channeled to engage the flanges of guides 173, 174 mounted on the side walls of the cabinet. Because these slides may be lubricated, a flexible pig tail grounding connection is desirably employed at 175. The arrangement is very clearly shown in Figs. 5 and 6, the plates 142 and 141 being supported on the dielectric posts 176, 177 while the grounded plates 154, 155 are mounted from the shelf on metal brackets 178, 179, the tuning plate 156, also grounded, as above described, being carried from the cabinet walls to remain in the cabinet when the rest of the assembly is removed on the sliding shelf 57.

Figure 2:
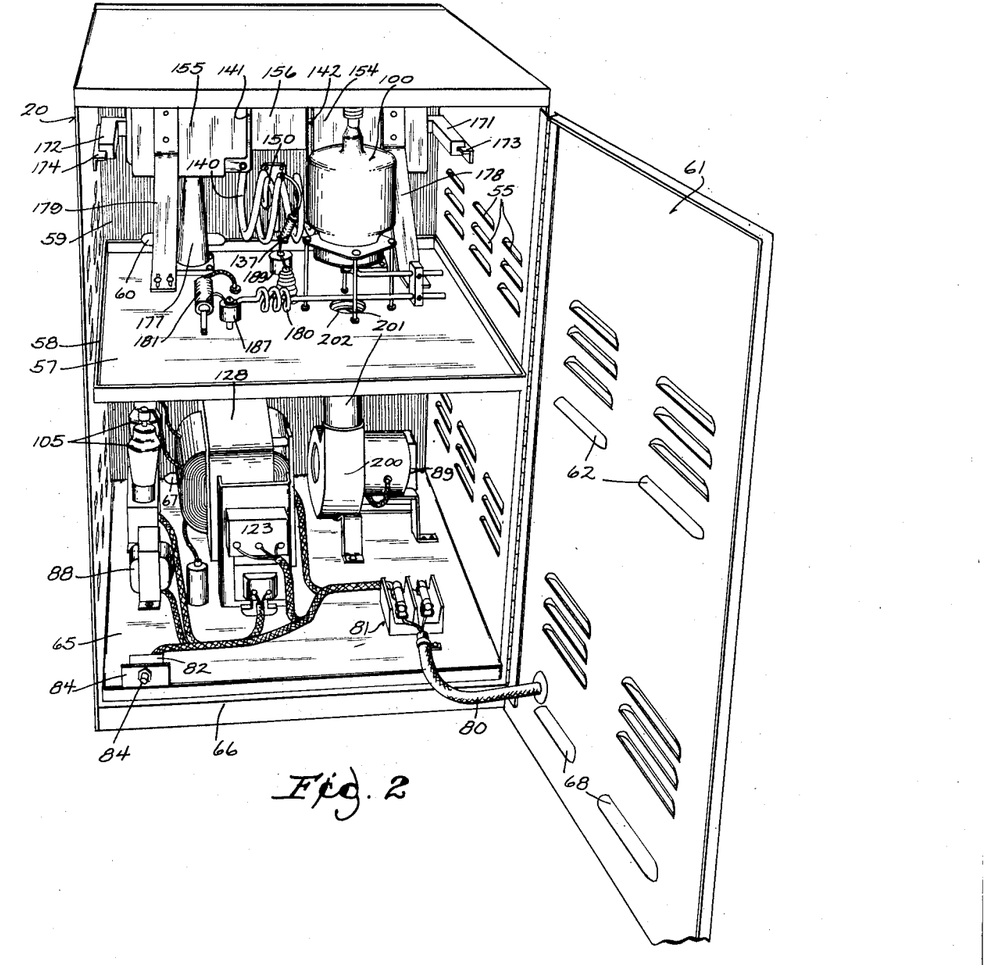
Fig. 2 is a view in perspective on a somewhat enlarged scale showing the rear of the cabinet with its rear door open.

Fig. 5 and Fig. 2 also show the mechanical mounting of the tank coil 140 directly from the plates 141, 142 to be supported through the plates and the insulators 176, 177 from the shelf 57.

The grid of the oscillator tube 100 is connected through grid coil 180 and a 2000 ohm resistor 181 and a suitable jack and receptacle and conductor 182 and 2000 ohm potentiometer 183 to a milliammeter 184 which is grounded and by-passed by a condenser 185 of .01 mfd. Between the grid coil 180 and the resistor 181 is a connection at 186 through .0005 mfd. condenser 187 to ground. It will be understood that the values given are merely illustrative and not critical.

The reading of meter 184 is indication of grid excitation of the oscillator tube 100. An abnormal reading indicates abnormal operation of the generator. If the milliammeter 184 gives no reading and the overload relay operates, this would indicate a shorted grid. With excessive grid excitation, and normal operation otherwise, this would indicate that tube 100 has become gaseous.

In normal use of the apparatus, the resistor 183 is adjusted to decrease grid excitation to a safe value for the oscillator tube 100. This is particularly desirable when working into relatively high impedance, as for example when a fixture is substituted for the portable hand tool.

The choke coils 137, 136 in the lead to the tank coil from the rectifiers may be of the order of 7 microhenries and 600 ma. current carrying capacity. One of these is above the shelf 57, as shown in Figs. 2 and 5. The other is beneath the shelf. An intermediate connection to ground is desirably made through the condenser 189.

Milliammeter 190 is mounted on the panel within the sight of the operator and its maximum reading informs him that the circuit is resonant to the work. He controls resonance by moving the control button 27 at the hand tool or the corresponding button 165 on the panel to cause motor 157 to move the condenser plate 156 between the extreme position shown in full and broken lines in Fig. 6. When the movable plate is so adjusted that milliammeter 190 gives a maximum reading, there will, in the present device, be maximum response in the development of heat in the work exposed to the high frequency voltage developed between electrodes 43, 44.

The milliammeter 190 is connected by conductor 191 to a center tap in the secondary of transformer 128. Conductor 191 leads through a jack and receptacle to conductor 192, which extends to the coil of overload relay 193 and thence to milliammeter 190. Shunted across the milliammeter 190 is a .01 mfd. condenser 194. Shunted across the coil of overload relay 193 is a properly polarized 1000 mfd. electrolytic condenser 195 and a variable resistor 196 of 10 ohm, 10 watt.

The value of current at which the overload relay 193 will trip is determined by the setting of resistor 196. In the event of overload, the relay 193 will only close momentarily because its closing energizes the coil of relay 197 to break the circuit through contact 120 and to close a holding circuit through contact 198. The breaking of the circuit through contact 120 permits relay 122 to open, thus interrupting plate voltage on the rectifier tubes.

It will be remembered that the starting of the circuit in the first instance was effected by the closing of relay 108 as a result of operation of one of the push buttons 24 or 111 on the hand tool or the cabinet, respectively. It will further be remembered that the position of switch 113 determines whether the opening of the circuit would be controlled manually by the release of the push button or would be controlled by the timer 112, the design of which is such that it returns to its starting point following each operation.

With switch 113 set for manual operation, and the timer in its "off" position, the functioning of the overload relay 193 and the resulting operation of the holding relay 197 breaks the circuit to relay 122 and interrupts the plate current, as already described. This situation continues so long as the push button switch 24 or 111 remains closed. Since the circuit of the holding relay 197 depends upon relay 108, which is, in turn, controlled by one or the other of these push button switches, it follows that on the release of the closed push button switch and the consequent opening of relay 108, the holding circuit through relay 197 will be broken and the contact 199 of this relay will move back into engagement with contact 120 in the normal position illustrated in Fig. 14. This leaves the circuit in condition for renewed operation in the manner originally described, provided the cause of the overload has been corrected. In other words, the holding relay holds itself open so long as the operator holds the push button 24 or 111 depressed. Release of the push button automatically re-establishes the circuit in condition for renewed operation, but it is assumed that the operator will, before resuming operation, remove the condition which caused the overload. This may involve simply an adjustment of resistor 196.

Release of the starting circuit by the operator is a prerequisite to the release of the overload holding circuit.

With the switch 113 set to connect the automatic timer 112, the circuit involved is somewhat different, but the operation is similar to that above described. In the event that the overload relay 193 is operated, the relay 197 responds immediately to cut off the plate current and establish a holding circuit which is now, however, completed through the timer to keep the plates of the rectifier tubes de-energized until the end of the timing period. At the conclusion of the timing period, a new cycle of operation can be initiated by the closing of either of the push button switches 24 or 111 but, obviously, unless the cause of the overload has been removed, the overload relay 193 will function as before.

A blower fan is provided at 200 for cooling the oscillator tube 100. The blower fan is mounted on the lower shelf 65 but has its discharge pipe 201 directed upwardly in registration with a port 202 in the upper shelf 57 immediately beneath tube 100.

The device, as above described, may be used for a variety of work, including everything from cooking to the setting of thermosetting adhesives. It is in the last mentioned field that the hand tool, as described herein, is most commonly employed. In commercial practice, such hand tools are used to set the adhesives which attach wooden panels to walls or plastic or wooden parts in furniture manufacture.

The fact that the variable condenser which tunes the circuit to the work is disposed in the cabinet, rather than in the hand tool, is a very important factor. Absence of sharp edges minimizes the possibility of flash to the case of the hand tool. This, and the absence of the space requirements of the condenser, makes it possible to have a very compact case. In addition, the "Q" of the hand tool herein described is determined by the nature of the material itself and is therefore always at a minimum. Addition of any variable capacitor across the tuned circuit in the hand tool would increase the "Q" of the hand tool and increase the possibility of flash to the case. The device as described is designed to be operated in a range of frequencies from 40 meg. to 43 meg. Approximately midway in this range, the match of the hand tool to the co-axial cable is 1 to 1. The maximum mis-match is of the nature of 1.25 to 1, which is much less than is usual. Mis-match is, of course, ordinarily the result of variation in the width, thickness, or moisture content of the work on which the hand tool is acting, the effective impedance being thereby varied.

Because of the very low degree of mis-match, it is theoretically possible to have an unlimited length of co-axial cable without serious attenuation due to a standing wave condition. In practice, of course, cable length is limited due to normal $I^2R$ losses.

Another advantage in having the hand tool so closely matched in impedence to the cable lies in the fact that a relatively constant value of impedence is presented to the generator in the cabinet. The plate meter thereby is enabled to give a relatively true indication of power output.

We claim:

1. In a tool in which high frequency is impressed between a pair of spaced electrodes, the combination with a handle and means for supporting said electrodes therefrom, of a transformer having means for supporting it from the handle and having connections between its ends and the respective electrodes and electrode plates having spring pins for which the electrodes provide sockets, said pins constituting means for the physical and electrical connections of the plates detachably with respective electrodes, said plates having a dielectric smoothing sheet with which they are unitarily connected and which extends between electrodes when said plates are connected to the electrodes.

2. The combination with a dielectric heating hand tool comprising spaced electrodes in capacitive reactance relation to work to be heated, the value of said capacitive reactance being subject to change depending on the nature of the work, and an inductive coil in said tool, said inductance and electrodes comprising a circuit which will resonate to a given supply frequency, of a remote high frequency generator having flexible means for transmitting high frequency to the electrodes of said tool, said generator including a tunable circuit having variable tuning means whereby to supply to said hand tool a frequency at which the hand tool circuit will resonate, a motor for operating said tuning means, and a manual motor control on said tool having a conductive connection with said motor for the remote manual control thereof.

3. The device of claim 2 in which the motor control comprises forward and reverse switches both normally closed and the motor has forward and reverse torque producing windings with which the switches are respectively connected by said conductor, the torque produced by said windings canceling out and the motor being normally stationary with both switches closed and being operated in a direction controlled by the switch which remains closed when one switch is opened.

4. In a device of the character described the combination with a dielectric heating hand tool comprising spaced electrodes in capacitive reactance relation to work to be heated, the value of said capacitive reactance being subject to change depending on the nature of the work, an inductive reactance including a transformer secondary extending between the electrodes and having spaced connections therewith, said inductive and capacitive reactances comprising a circuit which will resonate to a given supply frequency, a transformer primary in operative association with the secondary, and a high frequency cable leading to the primary, of a remote high frequency generator comprising an oscillatory electronic tube having a tunable oscillating circuit from which said cable leads, the tunable oscillating circuit including an adjustable tuning element whereby to supply to said hand tool a frequency at which the hand tool circuit will resonate, a reversible motor having forward and rearward driving connections and comprising an armature shaft connected with said element for moving it in circuit tuning directions, and switch means on the hand tool having flexible conductor means leading to the reversible connections of the motor for the remote manual control of said motor.

5. In a device of the character described, the combination with a hand tool comprising spaced electrodes, a transformer secondary extending between the electrodes and having spaced connections therewith, a transformer primary in operative association with the secondary, and a high frequency cable leading to the primary, of a remote high frequency generator comprising an oscillatory electronic tube having a tunable oscillating circuit from which said cable leads, the tunable oscillating circuit including an adjustable tuning element, a reversible motor having forward and rearward driving connections and comprising an armature shaft connected with said element for moving it in circuit tuning directions, and switch means on the hand tool having flexible conductor means leading to the reversible connections of the motor for the remote manual control of said motor, said switch means comprising separate switches connected with and controlling the respective forward and rearward driving connections of the motor and normally closed, the motor remaining stationary to hold said element in a predetermined position until one of said switches is opened and thereupon moving said element in the direction controlled by the switch which remains closed and promptly arresting further movement of said element upon the reclosing of the switch which was opened.

6. A device of the character described comprising the combination with a cabinet and a portable dielectric heating hand tool having spaced electrode in capacitive reactance relation to work to be heated, the value of said capacitive reactance being subject to change depending on the nature of the work, of a tunable high frequency generator in the cabinet, a high frequency transformer in the hand tool including a secondary connected with the electrodes, said secondary comprising an inductance in tunable circuit relation to the electrodes for resonance of said circuit at a given supply frequency, a high frequency transformer in the cabinet having a secondary connected with the primary of the high frequency transformer in the hand tool, the connection including high frequency flexible conductor means, means within the cabinet for effecting the tuning of said circuit whereby to supply to said hand tool a frequency at which the hand tool circuit will resonate, and means carried by the hand tool for operating said tuning means within the cabinet.

7. The device of claim 6 in which the tuning means within the cabinet comprises relatively movable condenser plates and reversible motor means connected with one of said plates for moving it with respect to another.

8. A device of the character described comprising the combination with a cabinet and a portable hand tool having spaced electrodes, of a tunable high frequency generator in the cabinet, a high frequency transformer in the hand tool including a secondary connected with the electrodes, a high frequency transformer in the cabinet having a secondary connected with the primary of the high frequency transformer in the hand tool, the connection including high frequency flexible conductor means, means within the cabinet for effecting the tuning of said circuit and means carried by the hand tool for operating said tuning means within the cabinet, said tuning means comprising relatively movable condenser plates and reversible motor means connected with one of said plates for moving it with respect to another, said cabinet comprising a bodily removable support upon which said high frequency generator and at least some of said plates are mounted, the movable plate aforesaid having means guiding it for movement respecting the cabinet and independently of said support, whereby said generator and the plates mounted thereon may be unitarily withdrawn from said movable plate.

9. The device of claim 8 in which said cabinet is provided with electrical elements cooperative with said generator, said cabinet and support being respectively provided with jacks and receptacles therefore providing connection between said generator and the electrical components fixed in the cabinet, which connections are broken by the withdrawal of said support and generator and reestablished by the replacement of a support and generator.

10. A device of the character described comprising the combination with a cabinet having front and side walls and a rear door and provided with a forward extension from its front wall, of removable shelves in the cabinet provided with ways upon which the shelves are slidable into and from the cabinet with the door open, power supply apparatus mounted on one of said shelves, high frequency generator apparatus mounted on the other of said shelves and including a tunable tank coil having relatively movable tuning condenser plates, certain of which are mounted on the last mentioned shelf and another of which is movably mounted in the cabinet, a motor within the cabinet extension having a driving connection for the movement of said last mentioned plate, a hand tool having spaced electrodes, means including a coaxial cable for delivering high frequency from said generator to said electrodes at the frequency determined by the adjustment of said plate, control means for said motor mounted on the hand tool and having an electrical connection along said cable to said motor, and electrical connections between the power supply apparatus and the generator apparatus including jacks respectively mounted on the shelves and receptacles therefore respectively mounted on the cabinet, the respective jacks being engaged in the respective receptacles in the normal positions of said shelves and being withdrawable from their respective receptacles in the movement of said shelves outwardly of said cabinet, each shelf and the apparatus mounted thereon being unitary for independent handling and requiring substantially no wiring connections other than as effected through said jacks and receptacles.

11. In a device for impressing a high frequency dielectric heating voltage on electrodes in capacitive reactance relation to work to be heated, the value of said capacitive reactance being subject to change depending on the nature of the work, a hand tool having electrodes mounted thereon, a remote source of voltage and a cable connecting said source to said hand gun, a transformer in said hand gun for increasing the voltage impressed on the electrodes, said transformer comprising a primary coil connected to the cable and a secondary coil connected to the electrodes, and a load balancing coil connected between the secondary coil and an electrode and comprising together with said electrode a tuned circuit resonant to a specific frequency of source voltage, said load balancing coil having its axis transverse to the axis of the secondary coil whereby the mutual inductance between the primary and secondary coils is not affected by the load balancing coil, and means for tuning the frequency of said remote source of voltage to the resonant frequency of the tuned circuit.

12. The device of claim 11 in which said tuning means comprises a manually operated control switch on said hand gun, a connecting circuit from said control switch to said remote voltage source, and means in said circuit at said voltage source and reponsive to manipulation of said switch to change the frequency of the voltage source.

13. In a device of the character described, a cabinet and a frequency generator therein for supplying voltage at a variable frequency to a dielectric heating tool, said generator comprising an output frequency tuner including a variable condenser having plates and means for varying the spacing of said plates for tuning purposes, said cabinet comprising a wall on which one of said plates is mounted and a sliding shelf on which another plate is mounted, said shelf being removable from the cabinet whereupon said plates of said condenser are separated.

14. The device of claim 13 in combination with a tuning motor having motion transmitting connections to said one plate, said motor having a relatively fixed position independent of the movement of the shelf.

References Cited in the file of this patent
UNITED STATES PATENTS

| | | |
|---|---|---|
| 2,165,502 | Peterson | July 11, 1939 |
| 2,283,670 | Evans | May 19, 1942 |
| 2,300,172 | Platz | Oct. 27, 1942 |
| 2,416,172 | Gregory et al. | Feb. 18, 1947 |
| 2,486,764 | Singer | Nov. 1, 1949 |
| 2,497,945 | Jennings | Feb. 21, 1950 |
| 2,514,246 | Knox | July 4, 1950 |
| 2,593,959 | Anderson et al. | Apr. 22, 1952 |
| 2,596,636 | Wright | May 13, 1952 |
| 2,624,830 | Muntz | Jan. 6, 1953 |
| 2,632,091 | Hagopian | Mar. 17, 1953 |
| 2,729,732 | Mogilner | Jan. 3, 1956 |